US012759319B2

(12) United States Patent
Kondo

(10) Patent No.: US 12,759,319 B2
(45) Date of Patent: Oct. 13, 2026

(54) INFORMATION PROCESSING DEVICE, CUTTING CONTROL METHOD, AND NON-TRANSITORY COMPUTER-READABLE STORAGE MEDIUM STORING CUTTING CONTROL PROGRAM

(71) Applicant: SEIKO EPSON CORPORATION, Tokyo (JP)

(72) Inventor: Toshiya Kondo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/250,522

(22) Filed: Jun. 26, 2025

(65) Prior Publication Data

US 2026/0001356 A1 Jan. 1, 2026

(30) Foreign Application Priority Data

Jun. 27, 2024 (JP) ................................ 2024-103696

(51) Int. Cl.
*B41J 11/66* (2006.01)

(52) U.S. Cl.
CPC .................................. *B41J 11/663* (2013.01)

(58) Field of Classification Search
CPC ..................................................... B41J 11/663
See application file for complete search history.

(56) References Cited

U.S. PATENT DOCUMENTS

| | | | | |
|---|---|---|---|---|
| 11,449,292 | B2 * | 9/2022 | Nojima | H04N 1/00631 |
| 2024/0028277 | A1 | 1/2024 | Arisawa | |
| 2025/0193331 | A1 * | 6/2025 | Hashimoto | G06F 3/1254 |

FOREIGN PATENT DOCUMENTS

| | | | | | |
|---|---|---|---|---|---|
| JP | 2011165111 | A | * | 8/2011 | |
| JP | 2014008679 | A | * | 1/2014 | |
| JP | 2014046951 | A | * | 3/2014 | |
| JP | 2023107074 | A | * | 8/2023 | G06F 3/125 |
| JP | 2024014317 | A | | 2/2024 | |

* cited by examiner

*Primary Examiner* — Christle I Marshall
(74) *Attorney, Agent, or Firm* — CHIP LAW GROUP

(57) ABSTRACT

An information processing device includes: an image acceptance unit that accepts an image to be a print target; a cutting machine designation unit that accepts cutting machine designation information which is information about a cutting machine for cutting a medium; and an arrangement setting unit that limits an area on the medium where the image can be arranged, based on the cutting machine designation information.

13 Claims, 11 Drawing Sheets

FIG. 2

CUTTING MACHINE INFORMATION

| | FIRST CUTTING MACHINE | SECOND CUTTING MACHINE | THIRD CUTTING MACHINE | |
|---|---|---|---|---|
| MAXIMUM CUTTABLE RANGE (WIDTH × LENGTH) | 300mm × 30m | 600mm × 40m | 1200mm × 50m | … |
| ACCURACY GUARANTEE RANGE (WIDTH × LENGTH) | 280mm × 2m | 580mm × 2m | 1150mm × 2m | … |

| | | | |
|---|---|---|---|
| MAXIMUM WIDTH OF ATTACHABLE MEDIUM | 400mm | 700mm | 1300mm |

INFORMATION PROCESSING DEVICE, CUTTING CONTROL METHOD, AND NON-TRANSITORY COMPUTER-READABLE STORAGE MEDIUM STORING CUTTING CONTROL PROGRAM

The present application is based on, and claims priority from JP Application Serial Number 2024-103696, filed Jun. 27, 2024, the disclosure of which is hereby incorporated by reference herein in its entirety.

BACKGROUND

1. Technical Field

The present disclosure relates to an information processing device, a cutting control method, and a non-transitory computer-readable storage medium storing a cutting control program.

2. Related Art

According to the related art, nesting printing in which images are printed as arranged side by side in a main scanning direction intersecting a paper transport direction (for example, JP-A-2024-14317) is known. JP-A-2024-14317 describes a technique of nesting printing by arranging images side by side in a main scanning direction intersecting a paper transport direction.

JP-A-2024-14317 is an example of the related art.

However, when images are printed as arranged side by side such that no extra margin is generated, the processing of the post-process may not be able to be executed due to the narrowing of the margin.

SUMMARY

According to an aspect of the present disclosure, an information processing device includes: an image acceptance unit that accepts an image to be a print target; a cutting machine designation unit that accepts cutting machine designation information which is information about a cutting machine for cutting a medium; and an arrangement setting unit that limits an area on the medium where the image can be arranged, based on the cutting machine designation information.

According to another aspect of the present disclosure, a cutting control method includes: causing an image acceptance unit to accept an image to be a print target; causing a cutting machine designation unit to accept cutting machine designation information which is information about a cutting machine for cutting a medium; and causing an arrangement setting unit to limit an area on the medium where the image can be arranged, based on the cutting machine designation information.

According to still another aspect of the present disclosure, a non-transitory computer-readable storage medium storing a cutting control program is provided, the cutting control program causing a computer to function as: an image acceptance unit that accepts an image to be a print target; a cutting machine designation unit that accepts cutting machine designation information which is information about a cutting machine for cutting a medium; and an arrangement setting unit that limits an area on the medium where the image can be arranged, based on the cutting machine designation information.

BRIEF DESCRIPTION OF THE DRAWINGS

FIG. 2 shows an example of a maximum cuttable range of a cutting machine.

DESCRIPTION OF EMBODIMENTS

Embodiments of the present disclosure will be described below in the following order.

Figure 1:
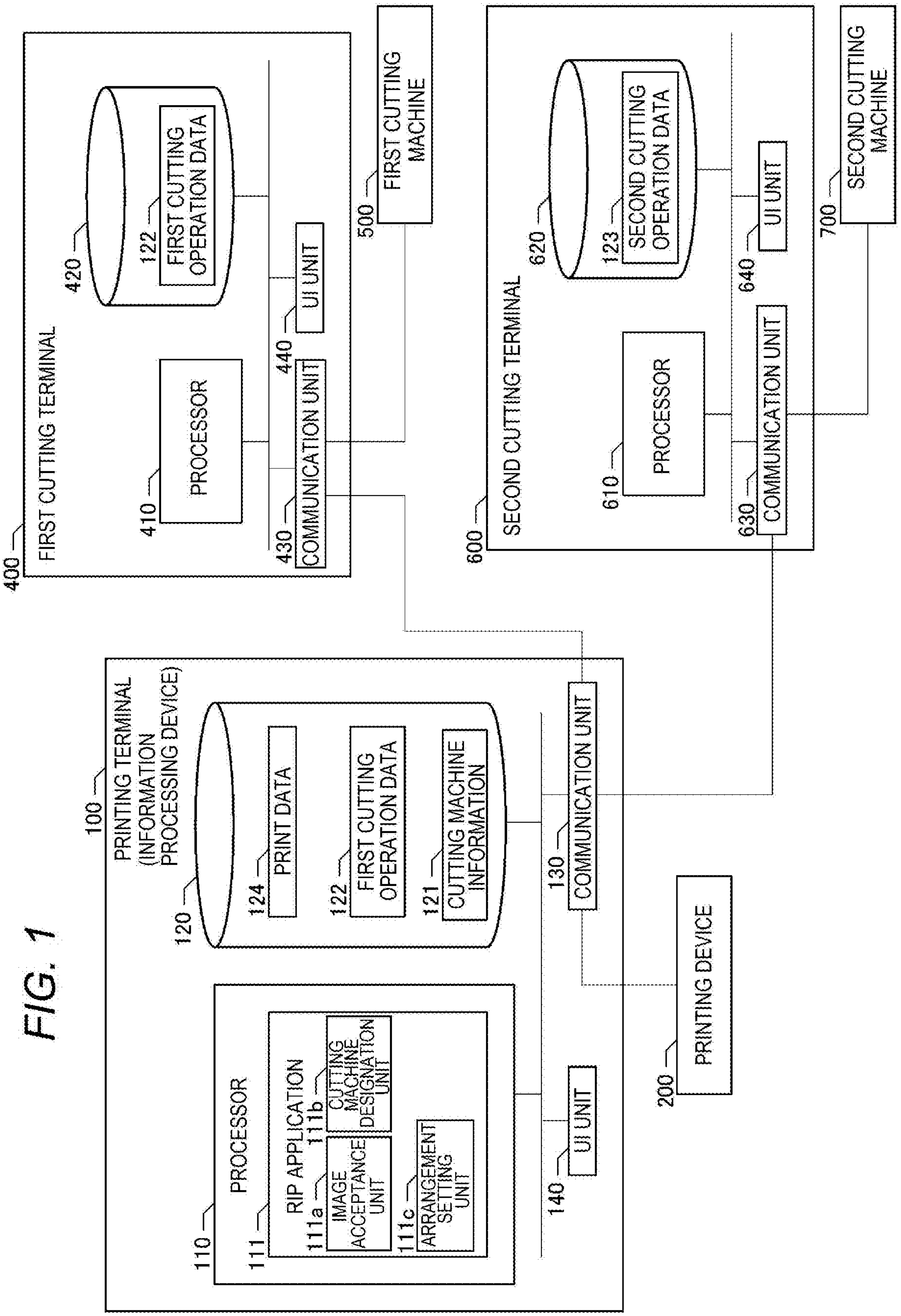
FIG. 1 is a block diagram showing an overall configuration.

(1) Overall Configuration (1-1) Configuration of Cutting Machine (1-2) Configuration of Cutting Terminal (1-3) Configuration of Printing Device (1-4) Configuration of Printing Terminal (2) Print Control and Cutting Control Processing (3) Other Embodiments (1) Overall Configuration FIG. 1 illustrates the configuration of an entire system including a printing terminal 100 as an information processing device according to an embodiment of the present disclosure. The printing terminal 100 executes a raster image processor (RIP) application 111, and thus accepts a print target image, generates print data for printing an image whose arrangement on a medium is set according to a print condition and a cutting condition by a printing device 200, and causes the printing device 200 to print the print data. By executing the RIP application 111, the printing terminal 100 generates cutting operation data representing a cutting operation command from the print target image and transmits the cutting operation data to the cutting terminal.

The printing device 200 in the present embodiment prints an image on a sheet-shaped (roll paper) medium. A cutting machine cuts the medium on which the image is printed, based on the cutting operation data generated according to the shape of the image. The maximum cuttable range of the cutting machine in the transport direction or the width direction (the width direction being a direction orthogonal to the transport direction) of the medium may vary, depending on the type of the cutting machine.

FIG. 2 is a diagram illustrating an example in which the maximum cuttable range differs for each type of cutting machine. The maximum cuttable range in the width direction may be narrower than the maximum width of the medium that can be set in the cutting machine. Also, as shown in FIG. 2, the accuracy guarantee range also differs for each type of cutting machine. The accuracy guarantee range is a cutting range in which an error of the cutting operation is assumed to be within a predetermined range, and is equal to or less than the maximum cuttable range in both the width direction and the length direction (that is, the transport direction). In the present embodiment, the description continues, assuming that the maximum cuttable range and the accuracy guarantee range are different between a first cutting machine 500 and a second cutting machine 700. In FIG. 1, two types of cutting machines, that is, the first cutting machine 500 and the second cutting machine 700, are illustrated, but the number of cutting machines is not limited thereto.

As described above, the maximum cuttable range and the accuracy guarantee range differ, depending on the type of cutting machine. Therefore, when the image is printed on the medium without considering such a difference, a printed object on which the image is printed in a range that the cutting machine cannot cut may be produced. In the present embodiment, in order to suppress the occurrence of such a situation, the printing terminal 100 implements a function of arranging a print target (cutting target) image within a range that is cuttable by a cutting machine used in a cutting process and then causing the printing device 200 to print the image.

(1-1) Configuration of Cutting Machine

Figure 3:
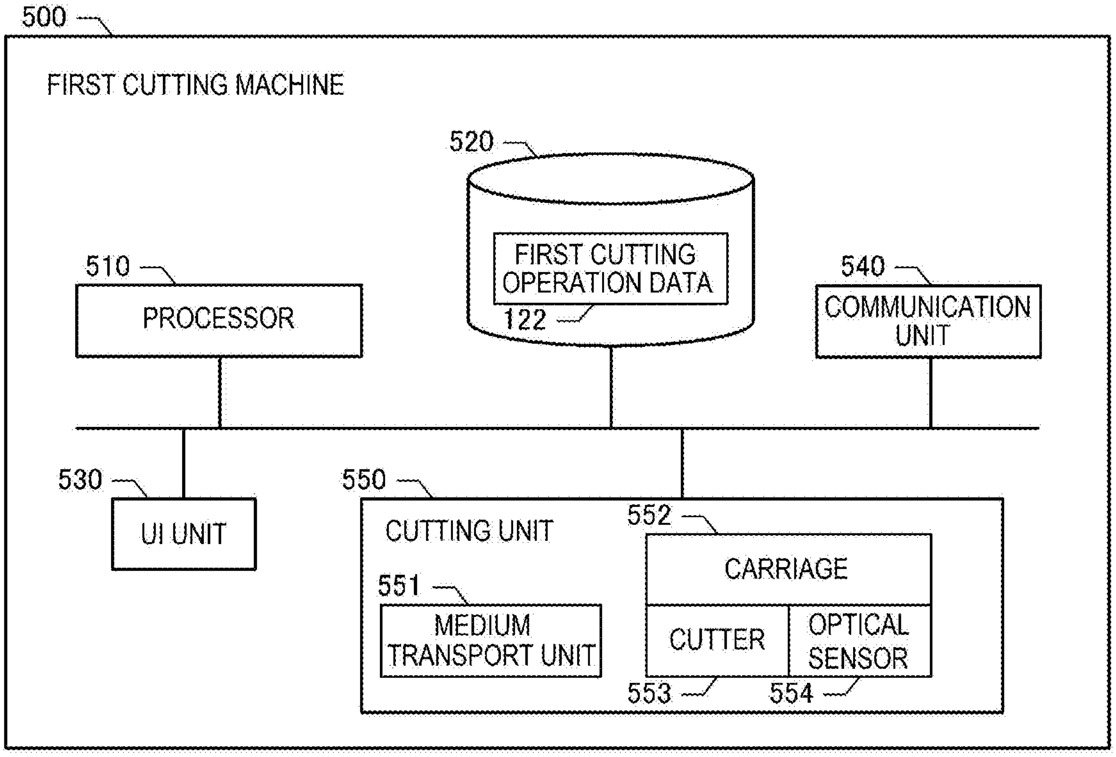
FIG. 3 is a block diagram showing the configuration of the cutting machine.

FIG. 3 is a block diagram illustrating the configuration of the first cutting machine 500. Since the second cutting machine 700 and other cutting machines have a similar configuration, the description of the individual cutting machines will be omitted. Note that the configuration and specifications of a cutting unit 550 may differ among the cutting machines. As described above, the maximum cuttable range and the accuracy guarantee range differ between the first cutting machine 500 and the second cutting machine 700. The cutting machine is also referred to as a cutting plotter.

The first cutting machine 500 includes a processor 510, a nonvolatile memory 520, a UI unit 530, a communication unit 540, and a cutting unit 550. The processor 510 includes an CPU, an ROM, an RAM, and the like, not shown, and executes a cutting control program recorded in the nonvolatile memory 520 and thus controls each part of the first cutting machine 500.

The processor 510 may be configured with a single chip, may be configured with a plurality of chips, or may be configured as an SoC with various functional blocks. For example, an ASIC may be employed instead of the CPU, or the CPU and the ASIC may cooperatively operate. When each device in the embodiment includes a processor, the processor can be implemented in various forms similar to the processor 510.

The UI unit 530 includes a touch panel display, switches, an LED, a speaker, and the like. The UI unit 530 presents various information about the first cutting machine 500 to the user of the first cutting machine 500 and accepts an operation from the user, under the control of the processor 510. The communication unit 540 includes a communication interface for communicating with another device according to various protocols for wired or wireless communication. In the present embodiment, the first cutting machine 500 can communicate with a first cutting terminal 400 via the communication unit 540. Upon receiving first cutting operation data 122 for executing the cutting operation from the first cutting terminal 400, the processor 510 stores the first cutting operation data 122 in the nonvolatile memory 520.

The cutting unit 550 includes a medium transport unit 551, a carriage 552, a cutter 553, and an optical sensor 554. In the present embodiment, the medium transport unit 551 includes a sensor, an actuator, and a mechanical component for transporting a printed object which is a medium in the form of roll paper and is produced by the printing device 200, based on the first cutting operation data 122.

Figure 4:
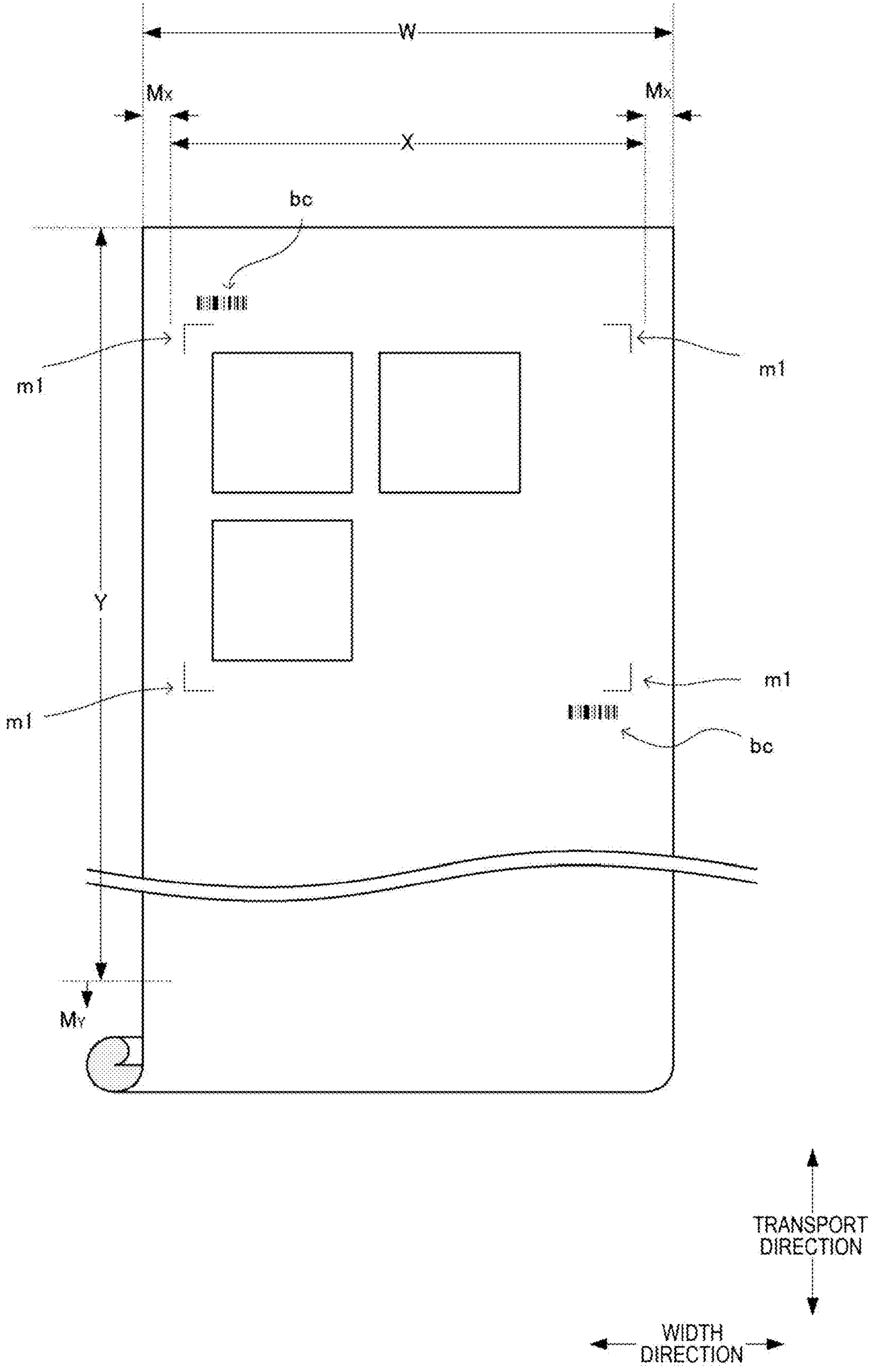
FIG. 4 shows an example of a printed object.

FIG. 4 is a schematic diagram illustrating an example of a printed object, and illustrates a transport direction, which is a direction in which a medium is transported when set in the cutting machine, and a width direction of the medium. The width direction of the medium is a direction orthogonal to the transport direction of the medium. The carriage 552 is supported by a rail or the like, not illustrated. The carriage 552 is moved in a direction parallel to a printing surface of the medium by a motor, an actuator, and a mechanical component, not illustrated. In this example, the direction parallel to the printing surface of the medium is, for example, the width direction of the medium. The cutter 553 and the optical sensor 554 are installed on the carriage 552. The cutter 553 held by the carriage 552 is driven in a direction orthogonal to the surface of the sheet-shaped medium by an actuator, not illustrated, and the tip of the cutter 553 is brought into contact with or separated from the medium. In a state where the tip of the cutter 553 is in contact with the medium, the carriage 552 holding the cutter 553 moves in the width direction and the medium is transported in the transport direction orthogonal to the direction of movement of the carriage 552, and cutting processing of the image formed on the medium is thus performed. The cutting machine may be a flat-bed-type device in which the medium transport unit is omitted, and in this case, the direction of movement of the carriage 552 is not limited to only the width direction of the medium and includes a longitudinal direction orthogonal to the width direction of the medium. The configuration of the cutting machine is not particularly limited as long as the cutting machine executes cutting by causing the cutter installed on the carriage to run.

The optical sensor 554 moves while being held by the carriage 552. The optical sensor 554 includes a light emitting unit and a light receiving unit, emits light to the medium, receives reflected light from the medium, and thus reads a cutting mark m1 and a barcode bc printed on the medium. The cutting mark m1 is a mark used for the cutting machine to perform position alignment with the medium on which the image to be cut is printed, and the image to be cut is printed in a rectangular area having a reference point of each cutting mark m1 as a vertex. The barcode bc includes reference information for referring to the position of the cutting mark m1 and first cutting operation data (vector data group (a set of vectors defining a cutting start position and a cutting end position)) for cutting the image present in the rectangular area indicated by the cutting mark m1, along a cutting line. The reference information may be in any form as long as the processor 510 can acquire desired cutting operation data, and is represented by, for example, a path indicating the storage location of the first cutting operation data, the file name of the first cutting operation data, or the like.

When instructed to read the barcode via the UI unit 530, the processor 510 causes the medium transport unit 551 to transport the medium, moves the carriage 552, and causes the optical sensor 554 to read the barcode. When the read barcode indicates the reference information of the first cutting operation data, the processor 510 acquires the first cutting operation data 122 from the first cutting terminal 400, based on the reference information. The processor 510 also reads the cutting mark m1 and performs position alignment for the cutting operation (for example, a position on the medium indicated by one of the four cutting marks m1 is used as a reference for driving the medium transport unit 551 and the carriage 552). The processor 510 acquires the first cutting operation data, based on the reference information indicated by the barcode, controls the medium transport unit 551, the carriage 552, and the cutter 553, based on the vector data group indicated by the first cutting operation data, and performs the cutting operation.

The maximum cuttable range (in the width direction) shown in FIG. 2 is the maximum range in the width direction that is cuttable by the cutting machine. In the present embodiment, the maximum cuttable range (in the width direction) is equal to the range in the width direction that is readable by the optical sensor 554.

(1-2) Configuration of Cutting Terminal

As shown in FIG. 1, in the present embodiment, one cutting terminal is coupled to each cutting machine. The cutting terminal is configured with a PC or a tablet, and implements a function of receiving cutting operation data from the printing terminal 100 and outputting the cutting operation data to the cutting machine. In FIG. 1, a cutting terminal corresponding to the first cutting machine 500 is referred to as a first cutting terminal 400, and a cutting machine corresponding to the second cutting machine 700 is referred to as a second cutting terminal 600.

In this example, the first cutting terminal 400 will be described as a configuration of the cutting terminal. Since the second cutting terminal 600 has a configuration similar to that of the first cutting terminal 400, the description thereof will be omitted. The first cutting terminal 400 includes a processor 410, a nonvolatile memory 420, a communication unit 430, and a UI unit 440.

The communication unit 430 includes a communication interface that communicates with another device according to various protocols for wired or wireless communication. In the present embodiment, the processor 410 can communicate with the printing terminal 100 and the first cutting machine 500 via the communication unit 430. The communication unit 430 may include an interface for communicating with various removable memories attached to the printing device 200. The UI unit 440 includes a display and a switch, and the processor 410 displays various information on the display and accepts an operation performed on the switch.

When the use of the first cutting machine 500 in the cutting process, which is a post-process of the printing process, is selected in the printing terminal 100, the printing terminal 100 also generates the first cutting operation data 122 for cutting the medium by the first cutting machine 500 when generating the print data. The first cutting terminal 400 receives the generated first cutting operation data 122 from the printing terminal 100 and stores the first cutting operation data 122 in the nonvolatile memory 420. The printing terminal 100 causes the printing device 200 to execute printing, based on the print data, and thus produce a printed object. When the user sets the printed object in the first cutting machine 500 and gives an instruction to read a barcode printed on the printed object, the first cutting machine 500 reads the barcode and requests the first cutting operation data 122 from the first cutting terminal 400, based on the reference information indicated by the barcode. The processor 410 of the first cutting terminal 400 transmits the first cutting operation data 122 to the first cutting machine 500 in response to the request. The first cutting machine 500 performs the cutting operation as described above, based on the first cutting operation data 122. When the use of the second cutting machine 700 is selected in the printing terminal 100, the printing terminal 100 generates second cutting operation data 123 for cutting the medium by the second cutting machine 700 and transfers the second cutting operation data 123 to the second cutting terminal 600, and the second cutting machine 700 performs the cutting operation, based on the second cutting operation data 123.

(1-3) Configuration of Printing Device

Figure 5:
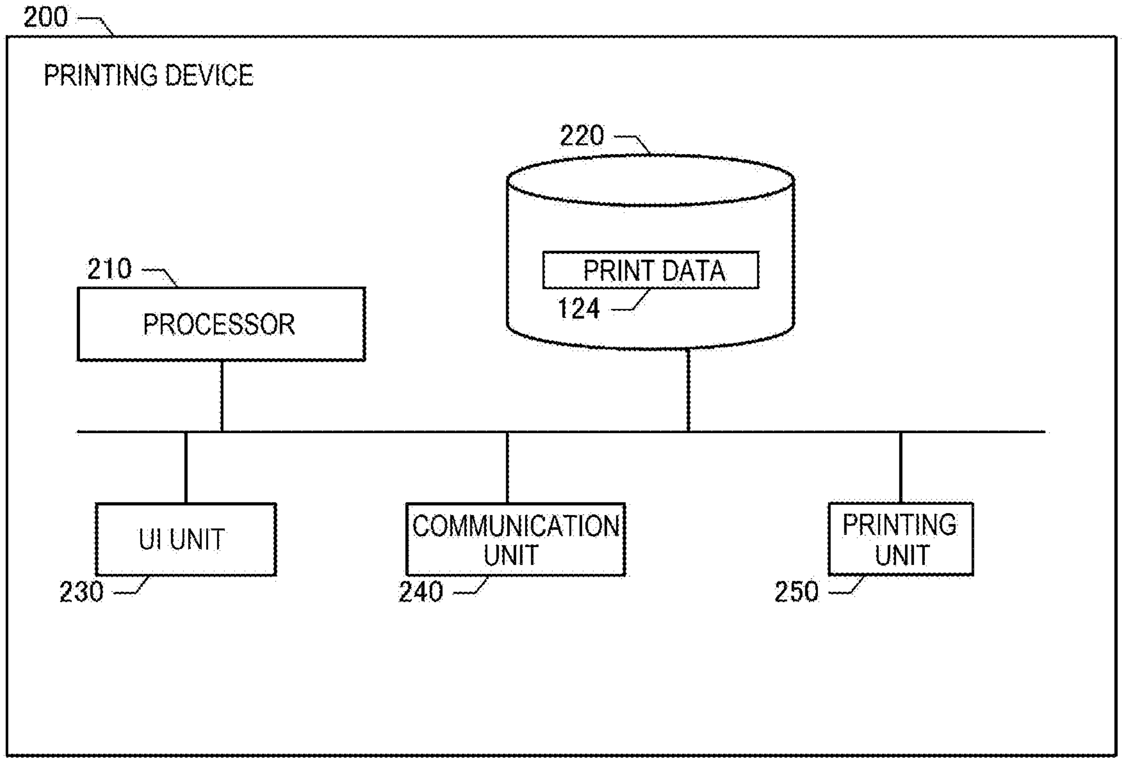
FIG. 5 is a block diagram showing the configuration of a printing device.

FIG. 5 is a block diagram showing the configuration of the printing device 200 shown in FIG. 1. The printing device 200 includes a processor 210, a nonvolatile memory 220, a UI unit 230, a communication unit 240, and a printing unit 250. The processor 210 executes a control program, not shown, recorded in the nonvolatile memory 220 and thus can control each unit of the printing device 200.

The nonvolatile memory 220 stores print data 124 transmitted from the printing terminal 100, and the processor 210 controls the printing unit 250, based on the print data 124, and thus executes printing.

The UI unit 230 includes a touch panel display, keys, an LED, a speaker, and the like. The processor 210 guides the user to various information via an output unit such as a touch panel display, an LED, or a speaker, and accepts an input instruction of the user via an input unit such as a touch panel display or a key.

The communication unit 240 includes a communication interface for communicating with another device according to various protocols for wired or wireless communication. In the present embodiment, the processor 210 can communicate with the printing terminal 100 via the communication unit 240. The communication unit 240 may include an interface for communicating with various removable memories attached to the printing device 200.

In the present embodiment, the printing unit 250 executes printing on a medium in the form of roll paper. The printing unit 250 includes a medium transport unit, not illustrated, and a carriage with a print head installed thereon. The print head includes nozzle rows corresponding to, for example, cyan, magenta, yellow, and black inks, and the inks are ejected from the nozzles provided in the nozzle rows. The carriage moves forward and backward along a specific direction (main scanning direction). The medium transport unit transports a print target medium. The medium transport unit transports the medium in a direction perpendicular to the main scanning direction. As the ejection of the inks from the nozzles in the process of the forward and backward movement of the print head and the transport of the medium by the medium transport unit are repeated, printing on the medium is performed.

The user sets the medium in the printing device 200 and operates the printing terminal 100 to instruct the printing device 200 to execute printing. Also, the user removes the medium (printed object) after the execution of printing from the printing device 200, moves the medium, sets the medium in the cutting machine used in the cutting process, which is a post-process of the printing process, and causes the cutting machine to execute the cutting operation on the medium.

(1-4) Configuration of Printing Terminal

The configuration of the printing terminal 100 will be described with reference to FIG. 1. The printing terminal 100 is a computer such as a PC or a tablet. The printing terminal 100 includes a processor 110, a nonvolatile memory 120 functioning as a storage unit, a communication unit 130, and a UI unit 140. The nonvolatile memory 120 stores a RIP application 111, other various programs, and cutting machine information 121. RIP is an abbreviation of "raster image processor", but the RIP application 111 is not limited to the generation of a raster image for the execution of printing by the printing device 200 and executes various kinds of processing, described later, by being executed by the processor 110. Hereinafter, the processing implemented by the function of the RIP application 111 is referred to as RIP processing.

FIG. 2 is a diagram illustrating an example of the cutting machine information 121. The cutting machine information 121 includes the maximum cuttable range in each of the width direction and the transport direction of the medium and the accuracy guarantee range in each of the width direction and the transport direction of the medium, for each type of cutting machine. Since the cutting machine information 121 is stored in the nonvolatile memory 120, the cutting machine information 121 can be referred to for setting a margin area, described later.

The UI unit 140 (see FIG. 1) includes a display, a touch panel, a speaker, a microphone, and the like. In the present embodiment, the processor 110 accepts input various instructions from the user via the UI unit 140 and outputs various information to the user.

The communication unit 130 includes an interface circuit for communicating with another device. The processor 110 can communicate with the printing device 200, the first cutting terminal 400, and the second cutting terminal 600 via the communication unit 130. Peripheral devices such as a keyboard, a mouse, and a display may be coupled to the printing terminal 100 via the communication unit 130, and the processor 110 may be configured to accept input various information from these peripheral devices or output various information thereto.

In the present embodiment, the RIP application 111 has an image acceptance function (image acceptance unit 111*a*) of accepting an image as a print target, a cutting machine designation function (cutting machine designation unit 111*b*) of accepting cutting machine designation information which is information about a cutting machine for cutting a medium, and an arrangement setting function (arrangement setting unit 111*c*) of limiting an area on the medium where an image can be arranged, based on the cutting machine designation information. The RIP application 111 also has a function of generating cutting operation data for cutting the image, and a function of generating print data, based on the print target image, a print condition, and a cutting condition, and causing the printing device 200 to execute printing.

Figure 6:
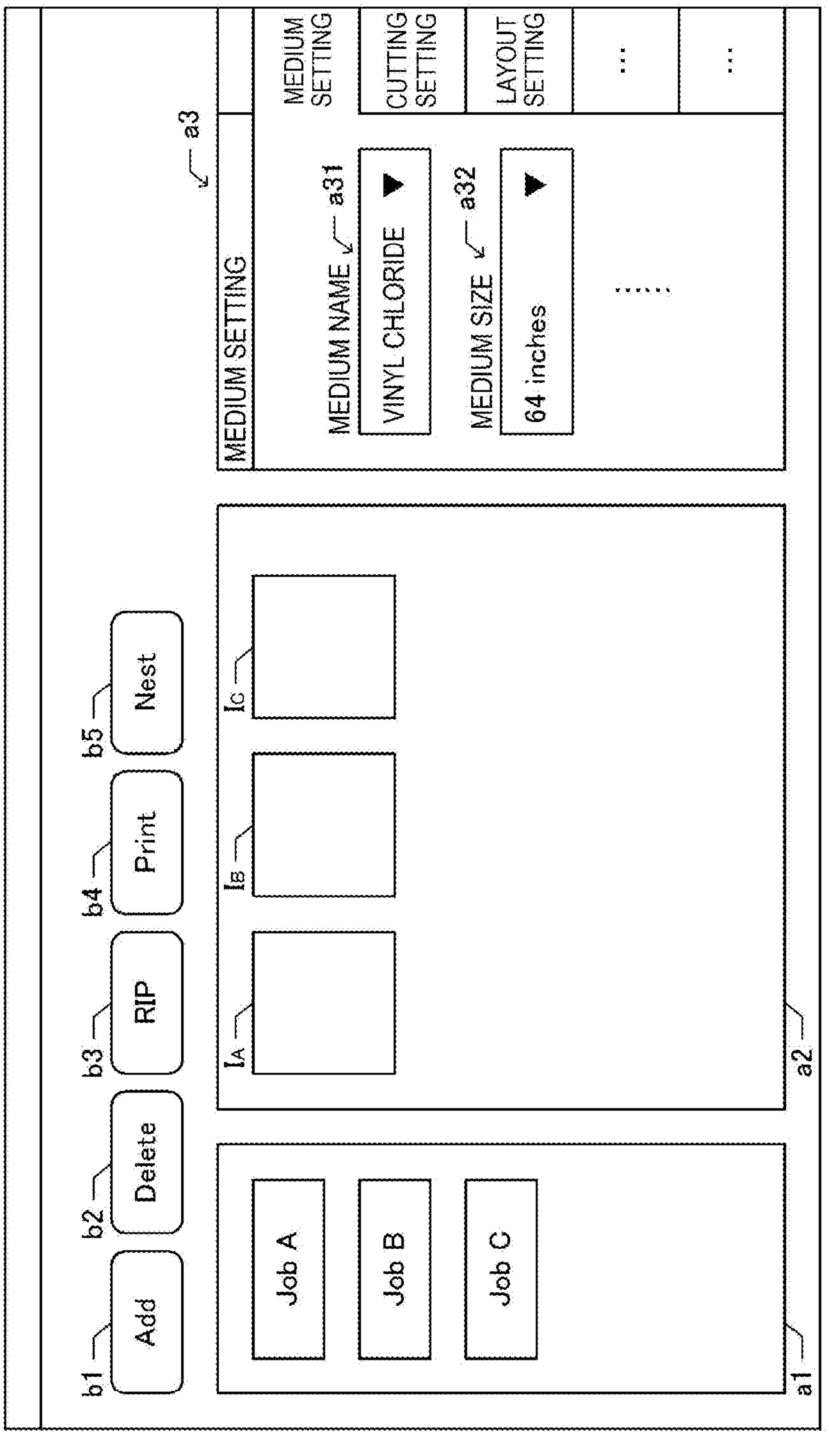
FIG. 6 shows an example of a screen of an application.

FIG. 6 shows an example of a screen displayed on the display of the UI unit 140 when the processor 110 executes the RIP application 111. As illustrated in FIG. 6, the screen of the RIP application 111 includes an Add button b1, a Delete button b2, a RIP button b3, a Print button b4, and a Nest button b5. The screen includes an image list unit a1, a preview unit a2, and a parameter setting unit a3.

The Add button b1 is a button for performing an operation of selecting and adding a print target image, and the Delete button b2 is a button for selecting one of the print target images and excluding the selected image from the print targets. The image list unit a1 is an area for displaying the names of images currently selected as print targets, in a list format.

Figure 8:
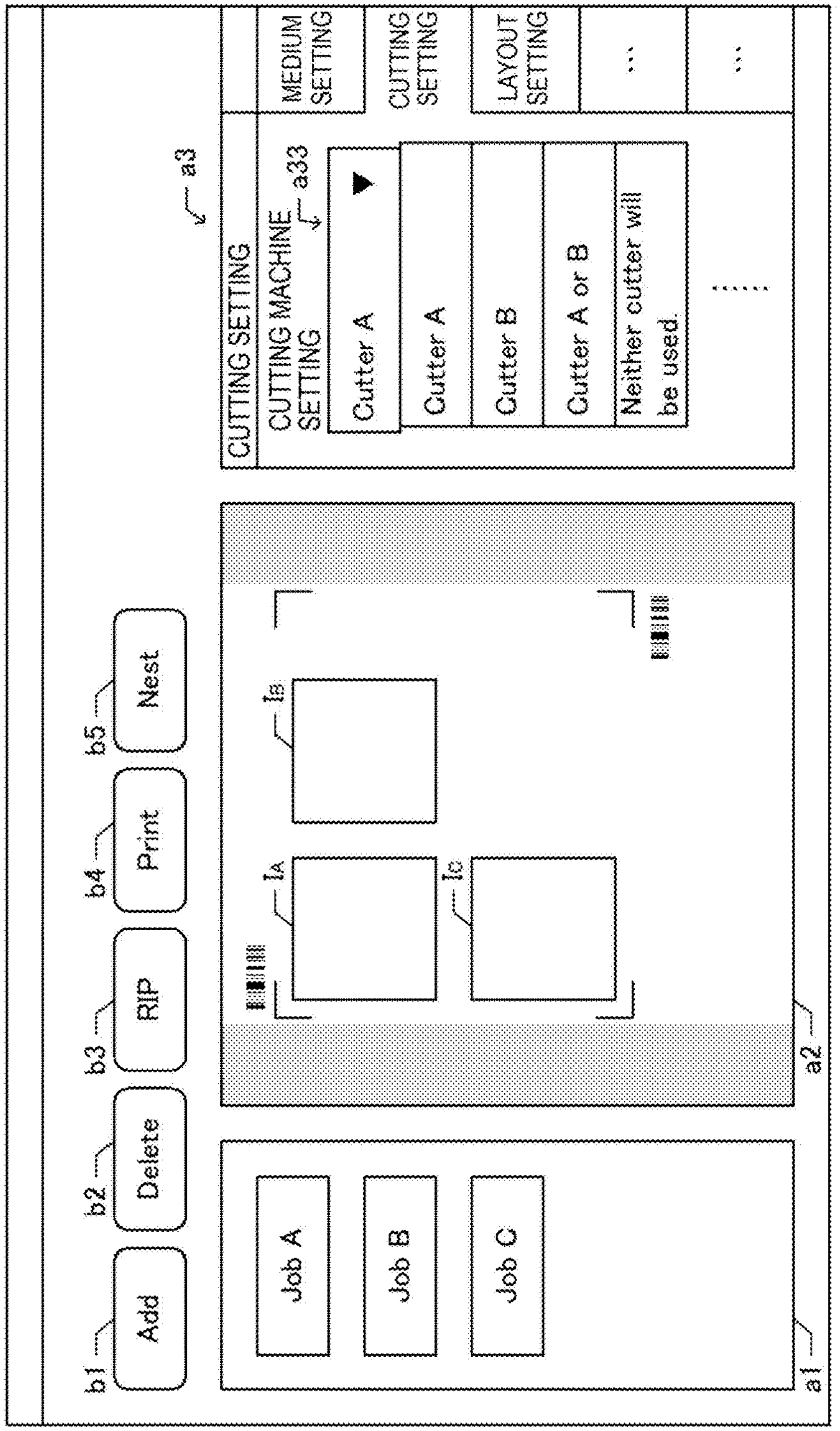
FIG. 8 shows an example of a screen of an application.
Figure 9:
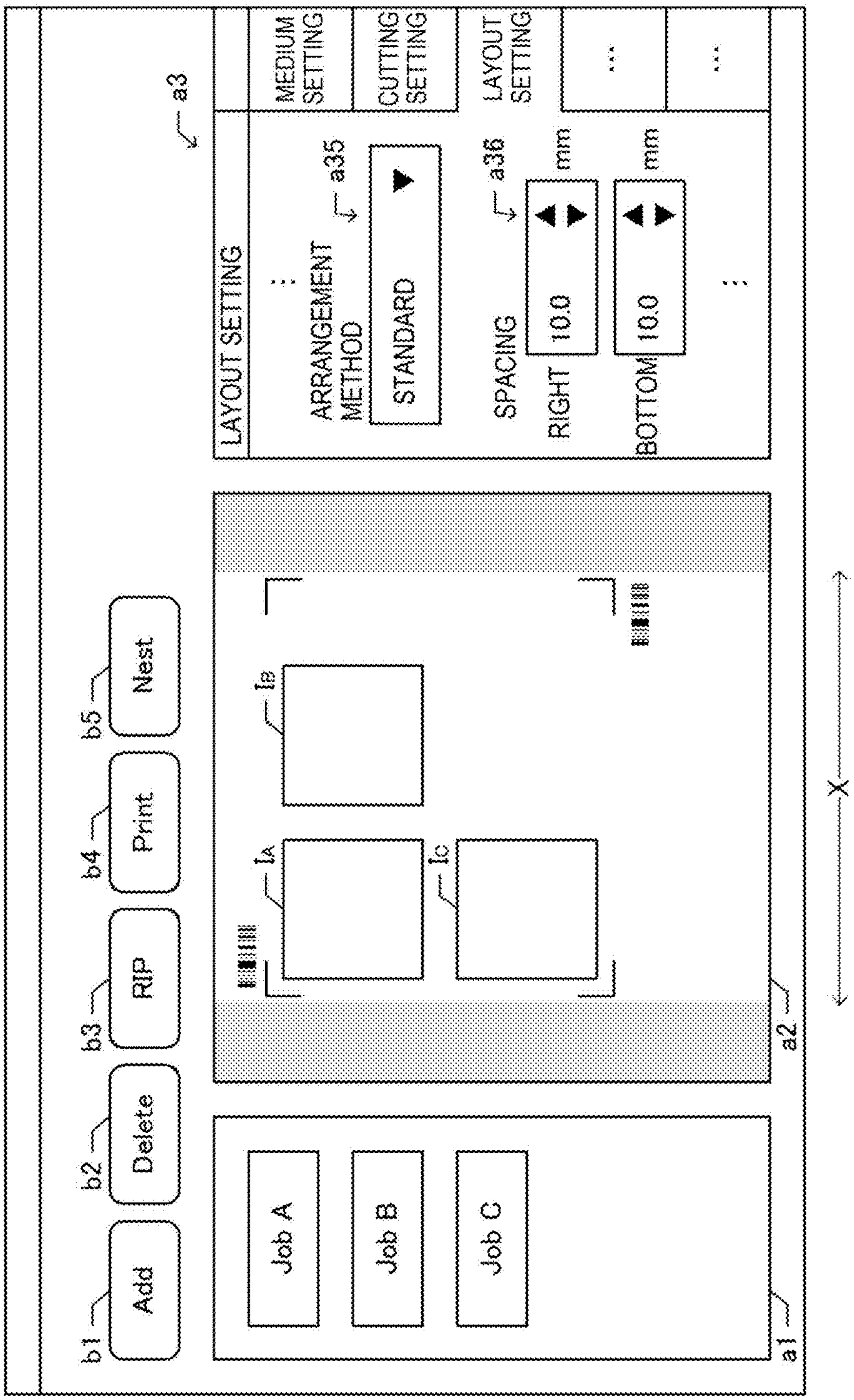
FIG. 9 shows an example of a screen of an application.

The parameter setting unit a3 is a setting unit for accepting the designation of various parameters including a medium setting (see FIG. 6), a cutting setting (see FIGS. 7 and 8), and a layout setting (see FIG. 9). The preview unit a2 is an area for displaying a preview image of a printed object when an image currently selected as a print target is printed by applying each parameter selected via the parameter setting unit a3. The Nest button b5 is a button for giving an instruction to execute processing of automatically arranging a plurality of images side by side.

The RIP button b3 is a button for giving an instruction to perform the RIP processing of the image displayed in the preview unit a2 and generating the print data 124. The print data 124 is at least data after the execution of rasterization processing (or may be data after color conversion processing or halftone processing). The Print button b4 is a button for instructing the printing device 200 designated by the user to execute print processing based on the generated print data 124.

With the function of the image acceptance unit 111*a*, the processor 110 accepts an image as a print target. Specifically, the processor 110 accepts an image designated by the user with the Add button b1 as a print target. The processor 110 accepts a print condition, which is a setting value designated by the user in relation to the printing operation in the parameter setting unit a3. Specifically, the print condition is, for example, a medium name, a medium size, a print quality, or the like.

Figure 7:
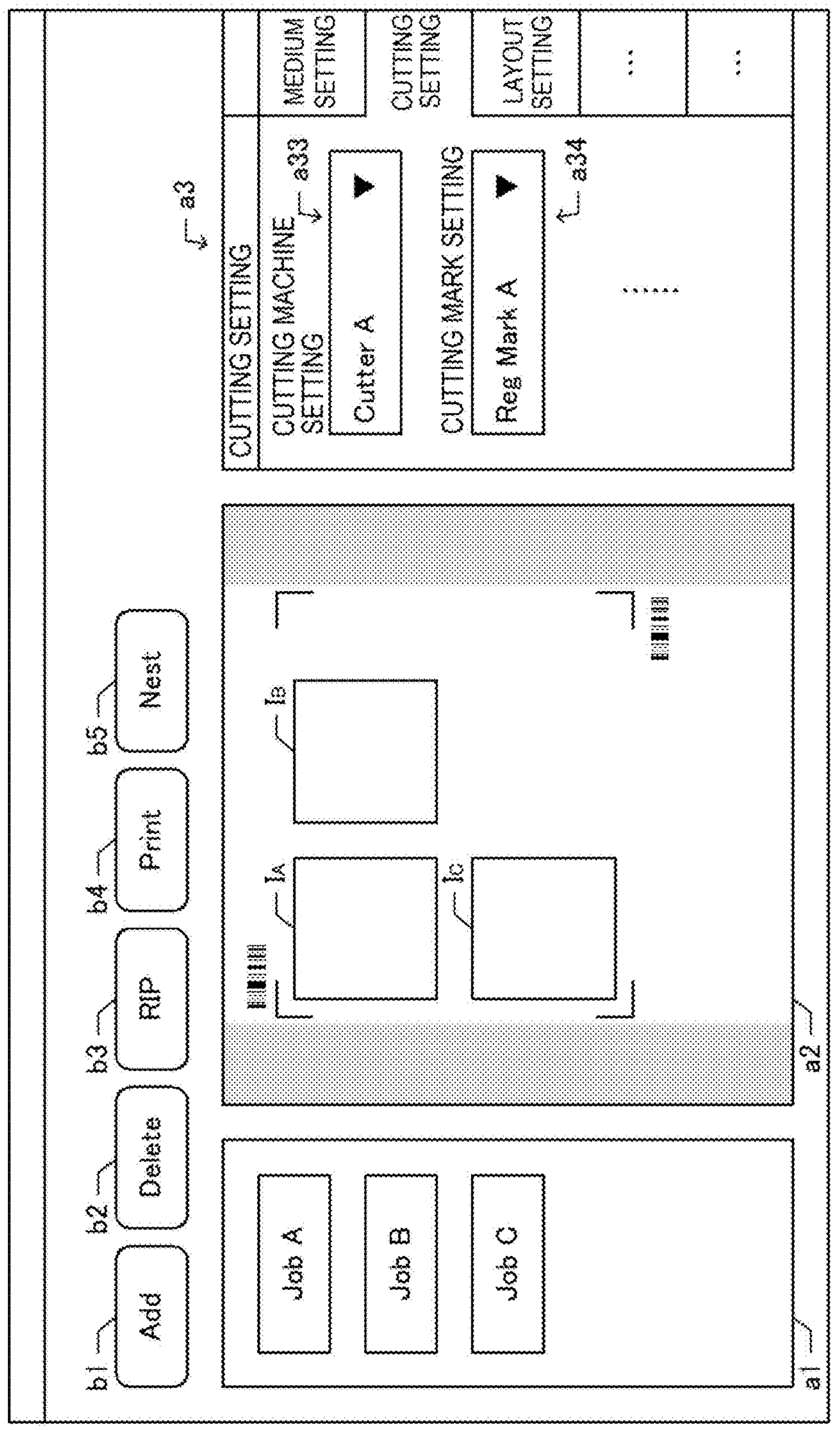
FIG. 7 shows an example of a screen of an application.

Also, with the function of the cutting machine designation unit 111*b*, the processor 110 accepts cutting machine designation information, which is information about the cutting machine for cutting the medium. The cutting machine designation information includes information indicating the type of the cutting machine. The parameter setting unit a3 shown in FIG. 7 shows settings related to cutting. The user can select a cutting setting on a setting menu tab, to display the cutting setting as shown in FIG. 7. As illustrated in FIG. 8, a cutting machine setting unit a33 is an operation unit that presents a list of cutting machines available for use and allows the user to select a cutting machine. The list of cutting machines available for use may be configured to display the types of cutting machines manually registered by the user in advance, or may be configured to automatically detect cutting machines existing in the same network as the printing terminal 100 and display the types of detected cutting machines.

FIG. 8 shows an example in which, when two types of cutting machines, that is, Cutter A as the first cutting machine and Cutter B as the second cutting machine, are available, four options of "Cutter A (first cutting machine)", "Cutter B (second cutting machine)", "Cutter A or B (first cutting machine or second cutting machine)", and "Neither cutter will be used" are displayed as a drop-down menu. "Cutter A (first cutting machine)", "Cutter B (second cutting machine)", and "Cutter A or Cutter B (first cutting machine or second cutting machine)" are options indicating the use of a cutting machine, and "Neither cutter will be used" is an option indicating that no cutting machine will be used. "Neither cutter will be used" indicates that the cutting process by the cutting machine is not performed as the post-process of the printed object. For example, when a large rectangular object for a poster or the like is printed by a printing device, cut by the cutter of the printing device, and completed (or shifted to a post-process other than cutting) without being subjected to a cutting process by a cutting machine, "Neither cutter will be used" is selected.

When the user selects one of the options from the list in the cutting machine setting unit a33, the processor 110 accepts the selection. That is, the processor 110 accepts the option selected by the user as the cutting machine designation information.

The processor 110 also limits the area on the medium where the image can be arranged based on the cutting machine designation information (arrangement setting unit 111*c*). Specifically, the processor 110 causes the area on the medium where the image can be arranged, to be different between when the cutting machine designation information indicates that a cutting machine is to be used and when the cutting machine designation information indicates that a cutting machine is not to be used. That is, when a cutting machine is not to be used, the area where the image is arranged on the medium is not limited, and when a cutting machine is to be used, in the present embodiment, an area outside the maximum cuttable range of the cutting machine to be used is set as the area where the arrangement of the image is limited.

When the non-use of any cutting machine is selected, the processor 110 arranges the image on the medium without limitation. In the example shown in FIG. 6, the width of the rectangle of the preview unit a2 (in the left-right direction of the page) indicates the width of the medium designated via a medium size setting unit a32. The preview unit a2 in FIG. 6 shows a state where images $I_A$, $I_B$, $I_C$ are arranged on the medium without limitation when the non-use of any cutting machine is selected. That is, when the non-use of any cutting machine is selected, the images $I_A$, $I_B$, $I_C$ are arranged on the medium such that a margin area, described later, is narrower than that in a state where the use of a cutting machine is selected. The images $I_A$, $I_B$, $I_C$ are previews of the respective images (Job A, Job B, Job C) displayed in the image list unit a1.

Meanwhile, the preview unit a2 in FIG. 7 shows a state where the use of the cutting machine A is selected. Specifically, the processor 110 acquires the maximum cuttable range of the cutting machine A with reference to the cutting machine information 121 (see FIG. 2), and sets the margin area as described later. For example, when the use of any one of two or more cutting machines is selected, such as "Cutter A or B", the processor 110 sets the margin area by adopting the smallest value among the maximum cuttable ranges in the width direction and the transport direction of these cutting machines. In FIG. 7, 8, 9, and the like, a portion colored in gray in the preview unit a2 indicates the area (margin area) where the arrangement of the image is limited, in a slightly exaggerated manner.

The area where the arrangement of the image is limited on the medium is referred to as a margin area. The gray area in the preview unit a2 in FIG. 7 is a margin area. In the present embodiment, when the use of any one of the cutting machines is selected and a width W (see FIG. 4) of the medium is larger than the maximum cuttable range in the width direction, a margin area where no image is arranged is set in the width direction. Also, though not illustrated in FIG. 7, a margin area for limiting the arrangement of the image is also set in the transport direction of the medium. In the present embodiment, these margin areas are set, based on the maximum cuttable range of the cutting machine to be used. That is, the margin area in the width direction is predetermined according to the maximum cuttable range in the width direction. The margin area in the transport direction is determined according to the maximum cuttable range in the transport direction. In another embodiment, the margin area may be set, based on the accuracy guarantee range of the cutting machine to be used.

When the width W (see FIG. 4) of the medium is larger than a maximum cuttable range X in the width direction, a range from each of the left and right ends of the medium in the width direction to a length of ((W−X)/2) is a margin area $M_X$ in the width direction. Also, an area separated by a maximum cuttable range Y or more in the transport direction from a reference position in the transport direction (for example, the start end in the transport direction of the roll paper as illustrated in FIG. 4) prescribed by the manufacturer of the cutting machine is a margin area $M_Y$ in the transport direction.

The margin area set in this manner is handled by the processor 110 as an area where no image is arranged when an image is automatically arranged as described later. Therefore, since the margin area is set in this manner, when cutting is performed using the cutting machine, an area different from the area when a cutting machine is not to be used can be set as the area where the image can be arranged. More specifically, as described above, when the cutting machine designation information indicates that a cutting machine is to be used, the processor 110 expands the margin area compared with when the cutting machine designation information indicates that a cutting machine is not to be used. In this way, when cutting is performed using a cutting machine, a narrower area than when a cutting machine is not to be used can be set as the area for arranging the image. As a result, when a cutting machine is to be used, processing can be performed such that the image is arranged within the maximum cuttable range of the cutting machine, and when a cutting machine is not to be used, the image can be arranged in an area closer to the end part of the medium than when a cutting machine is to be used, and the amount of consumption of the roll paper, which is the medium, can be suppressed.

Also, with the arrangement setting unit, the processor 110 causes the area on the medium where the image can be arranged, to be different between when the cutting machine designation information indicates that the first cutting machine is to be used as the cutting machine and when the cutting machine designation information indicates that the second cutting machine is to be used as the cutting machine. That is, when the use of a cutting machine is selected, the processor 110 changes the area where the image can be arranged, according to the type of the cutting machine. Specifically, the processor 110 acquires the maximum cuttable range corresponding to the type of the cutting machine designated by the cutting machine designation information with reference to the cutting machine information 121 (see FIG. 2), and sets the margin area as described above. In this way, the image can be arranged in areas having different sizes according to the cutting machine.

The user can press the Nest button b5 to give an instruction to automatically arrange the image. When the user presses the Nest button b5, the processor 110 automatically sets the arrangement of the image on the medium to be appropriate. That is, the processor 110 generates a preview image of each image added to the image list unit a1. In this example, the appropriate arrangement of the images means, for example, that the images do not overlap each other, that the images are arranged at a predetermined spacing, and that the generation of a margin significantly exceeding the predetermined spacing is prevented as much as possible in an area other than the area where the arrangement of the images is limited due to the selection of the cutting machine. Also, acquiring a parameter selected with respect to the layout as shown in FIG. 9 enables appropriately setting of the automatic arrangement of the image in a form desired by the user. For example, an arrangement method setting unit a35 and a spacing setting unit a36 are provided as a parameter setting unit related to the layout. The arrangement method setting unit a35 provides options such as standard (top-left alignment), top-right alignment, bottom-left alignment, and bottom-right alignment. The spacing setting unit a36 can set a spacing from an image adjacent to the right side of the image and a spacing from an image adjacent to the bottom side of the image. These spacings are examples of the foregoing predetermined spacing. For example, when the user presses the Nest button b5 in a state where such a parameter related to the layout is set by the user (in a state where a default value is adopted when the user does not set the parameter anew), the processor 110 adopts the length of the image in the left-right direction and the length of the image in the up-down direction, the arrangement method selected by the arrangement method setting unit a35, and the length of the spacing set by the spacing setting unit a36, and arranges the image in the area where the arrangement of the image is not limited.

For example, in the case of the example shown in FIG. 9, since a value found by subtracting the sum of the length of the image $I_A$ in the left-right direction, the length of the image $I_B$ in the left-right direction, and the spacing on the right side set by the spacing setting unit a36 multiplied by two (two spacings on the right side of $I_A$ and on the right side of $I_B$) from the maximum cuttable range X in the width direction is shorter than the length of the image $I_C$ in the left-right direction, the processor 110 arranges the image $I_C$ below the image $I_A$ and the image $I_B$. In the case of this example, since the sum of the length of the image $I_A$ in the up-down direction, the spacing on the bottom side, and the length of the image $I_C$ in the up-down direction is less than the maximum cuttable range in the transport direction of the medium, the processor 110 determines that the images can be arranged in two tiers, and therefore arranges the image $I_C$ in the second tier. As described above, since the function of automatically and appropriately arranging a plurality of images is provided, the burden on the user can be reduced as compared with manual arrangement.

The processor 110 displays a preview screen showing the result of setting the arrangement of the images in this manner. In the present embodiment, the preview unit a2 is the preview screen. As described above, when the cutting machine designation information indicating that a cutting machine is to be used is accepted, the uncuttable area, which is an area where the cutting machine cannot execute the cutting operation, is shown in the preview screen. In the present embodiment, the uncuttable area is an area where the arrangement of the image is limited, and is the above-described margin area. Since the preview unit a2 is configured to separately display the area where the image is arranged and the area where the arrangement is limited (uncuttable area, margin area), the probability that the user may erroneously recognize the uncuttable area as an unnecessary margin when the image is automatically arranged can be suppressed.

When the user presses the Nest button b5 again, the processor 110 returns the arrangement of the image to the state before the automatic arrangement processing. Therefore, in the preview unit a2, the image is displayed at the position before the automatic arrangement processing.

The user can also manually arrange the images. That is, when the user moves the image object in the preview unit a2 within the rectangular frame of the preview unit a2 by an operation such as drag and drop using a mouse, not illustrated, the processor 110 changes the position of the image to the position after the movement. When the user manually arranges the image object, the area in which the arrangement of the image is limited is displayed in gray as illustrated in FIG. 9 and therefore the user can distinguish and grasp the area where the image may be arranged and the area where the arrangement is limited. Then, the image can be manually arranged, using the size of the area where the image may be arranged, as a guide. Note that the drop operation by the user using the mouse may be prohibited in the area where the arrangement of the image is limited.

A cutting mark setting unit a34 illustrated in FIG. 7 is a setting unit for setting the type of a cutting mark for performing position alignment with respect to a cutting target image printed on the medium. The settings menu related to the cutting is not limited thereto, and various other menus may be provided. The cutting mark is a mark indicating a reference position when the cutting machine executes the cutting operation. In the present embodiment, the cutting mark is in the form of two line segments intersecting at a right angle at the end (so-called L-shape). When the user gives an instruction to arrange the cutting mark of the selected type, the processor 110 arranges the cutting mark in a cuttable area which is an area where the cutting machine indicated by the cutting machine designation information can execute the cutting operation on the medium. The cuttable area is an area corresponding to the maximum cuttable range of the cutting machine indicated by the cutting machine designation information on the medium.

That is, the processor 110 arranges the cutting mark m1 outside the area occupied by all the arranged image objects, in the cuttable area. In this way, the cutting mark can be printed within a range readable by the optical sensor of the cutting machine.

Also, the processor 110 arranges a barcode related to the cutting operation to be executed by the cutting machine, in the cuttable area, which is the area where the cutting machine indicated by the cutting machine designation information can execute the cutting operation on the medium. That is, the processor 110 generates a barcode indicating the reference information of the cutting operation data, and arranges the barcode bc at a position spaced apart from the cutting mark m1 by a predetermined distance outside a rectangular area having the reference point of the cutting mark m1 as a vertex, in the cuttable area. With this configuration, the barcode bc can be printed within a range in which the optical sensor of the cutting machine can read the barcode bc.

As described above, according to the present embodiment, the area on the medium where the image can be arranged is limited, based on the cutting machine designation information. Therefore, when the cutting machine designation information is not taken into consideration and the area on the medium where the image can be arranged is not limited, the production of a printed object on which the image is arranged in an area that cannot be cut by the cutting machine (waste paper) can be suppressed.

(2) Print Control and Cutting Control Processing

Figure 10:
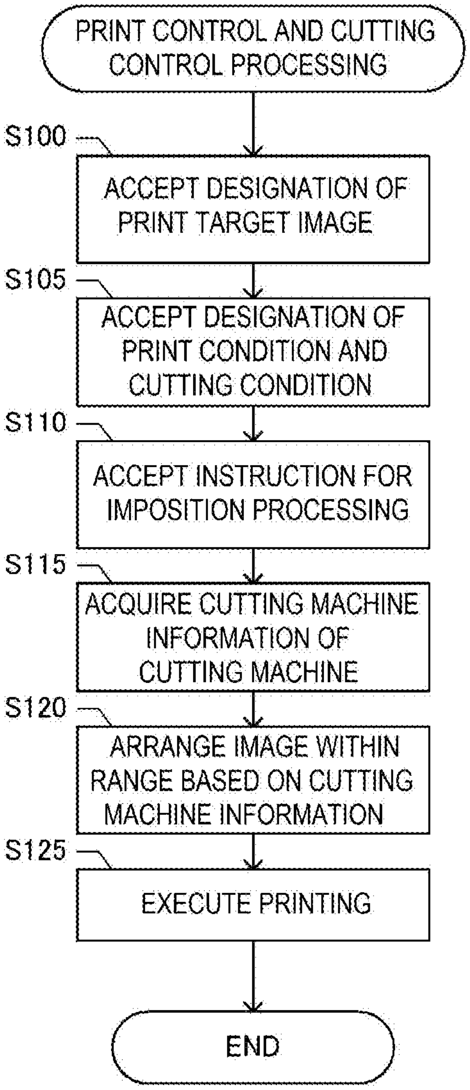
FIG. 10 is a flowchart showing print control and cutting control processing.

FIG. 10 is a flowchart showing print control and cutting control processing. The processing in FIG. 10 is started when the RIP application is activated in the printing terminal 100. As the print control and the cutting control processing are started, the processor 110 accepts a designation of a print target image (step S100). Specifically, when the user operates the Add button b1 on the screen shown in FIG. 6 to perform an operation of adding a print target image, the processor 110 acquires the added image as a print target. The print target image may be a single image or a plurality of images.

Subsequently, the processor 110 accepts a print condition and a cutting condition of the accepted print target image (step S105). Specifically, when the user selects each setting tab in the parameter setting unit a3 and inputs a desired setting (see FIGS. 6, 7, 8, and 9), the processor 110 accepts the input setting value. The setting value set at this time includes the setting value of the cutting machine setting unit a33 as shown in FIG. 7. That is, the processor 110 accepts whether to execute the cutting operation using the cutting machine after the printing process, and cutting machine designation information indicating the cutting machine to be used when the cutting machine is to be used.

Subsequently, the processor 110 accepts an instruction for imposition processing (step S110). That is, when the user operates the Nest button b5 to give an instruction for automatic imposition processing, the processor 110 accepts the instruction for the imposition processing.

Subsequently, the processor 110 acquires cutting machine information of the designated cutting machine (step S115). That is, when cutting machine designation information indicating that one of the cutting machines is to be used is accepted in step S105, the processor 110 refers to the cutting machine information 121 and acquires the maximum cuttable range of the cutting machine designated in step S105.

Subsequently, the processor 110 automatically arranges the image within the range based on the cutting machine information (step S120). That is, the processor 110 arranges the print target images in a row in the width direction of the medium at a predetermined spacing in the order of the list within the maximum cuttable range in the width direction. When the images are arranged in this way, the image beyond the maximum cuttable range in the width direction and the subsequent images are similarly arranged from the next tier in the transport direction. This arrangement may reflect the parameters accepted in the layout settings shown in FIG. 9. When the processor 110 accepts an instruction to arrange the barcode bc or an instruction to arrange the cutting mark m1 from the user, the processor 110 arranges the barcode bc or the cutting mark m1 within the maximum cuttable range.

Subsequently, the processor 110 executes printing (step S125). That is, when the user operates the Print button b4 after operating the RIP button b3, the processor 110 performs RIP processing on the image shown in the preview unit a2 and thus generates the print data 124 and the cutting operation data (122). Moreover, the processor 110 outputs the print data 124 to the printing device 200 and causes the printing device 200 to execute printing based on the print data.

(3) Other Embodiments

The foregoing embodiment is an example for carrying out the present disclosure, and various other embodiments can be employed. For example, the information processing device according to the present disclosure may be configured as integrated with the printing device. The information processing device may be configured as a device (server) separate from the terminal operated by the user or the printing device. The information processing device and the cutting terminal may be configured as an integrated device.

The arrangement setting unit may be configured to cause the area where the image can be arranged, to be different between when a cutting machine is to be used and when a cutting machine is not to be used. Whether to use a cutting machine may be determined, based on the selection content of the user as in the above embodiment, or may be determined as follows. For example, when the image data of the print target includes spot color data indicating a cutting line, it may be determined that a cutting machine is to be used, and when the image data of the print target does not include the spot color data, it may be determined that a cutting machine is not to be used. When the image data of the print target does not include the spot color data indicating the cutting line, for example, in the cutting machine setting unit a33 in FIG. 8, the option of the cutting machine may be grayed out and thus made unselectable, and the option indicating that a cutting machine is not to be used may be selected by default.

Also, for example, it may be determined that a cutting machine is not to be used, based on the fact that the connection of a cutting machine to the network to which the information processing device is connected is not detected.

Also, in the above embodiment, an example has been described in which the cuttable area and the margin area are set using the maximum cuttable range of the cutting machine, but the cuttable area and the margin area may be set, based on the accuracy guarantee range of the cutting machine. Also, the maximum cuttable range of the cutting machine may be adopted in the width direction, and the accuracy guarantee range of the cutting machine may be adopted in the transport direction, or the user may select these ranges.

Figure 11:
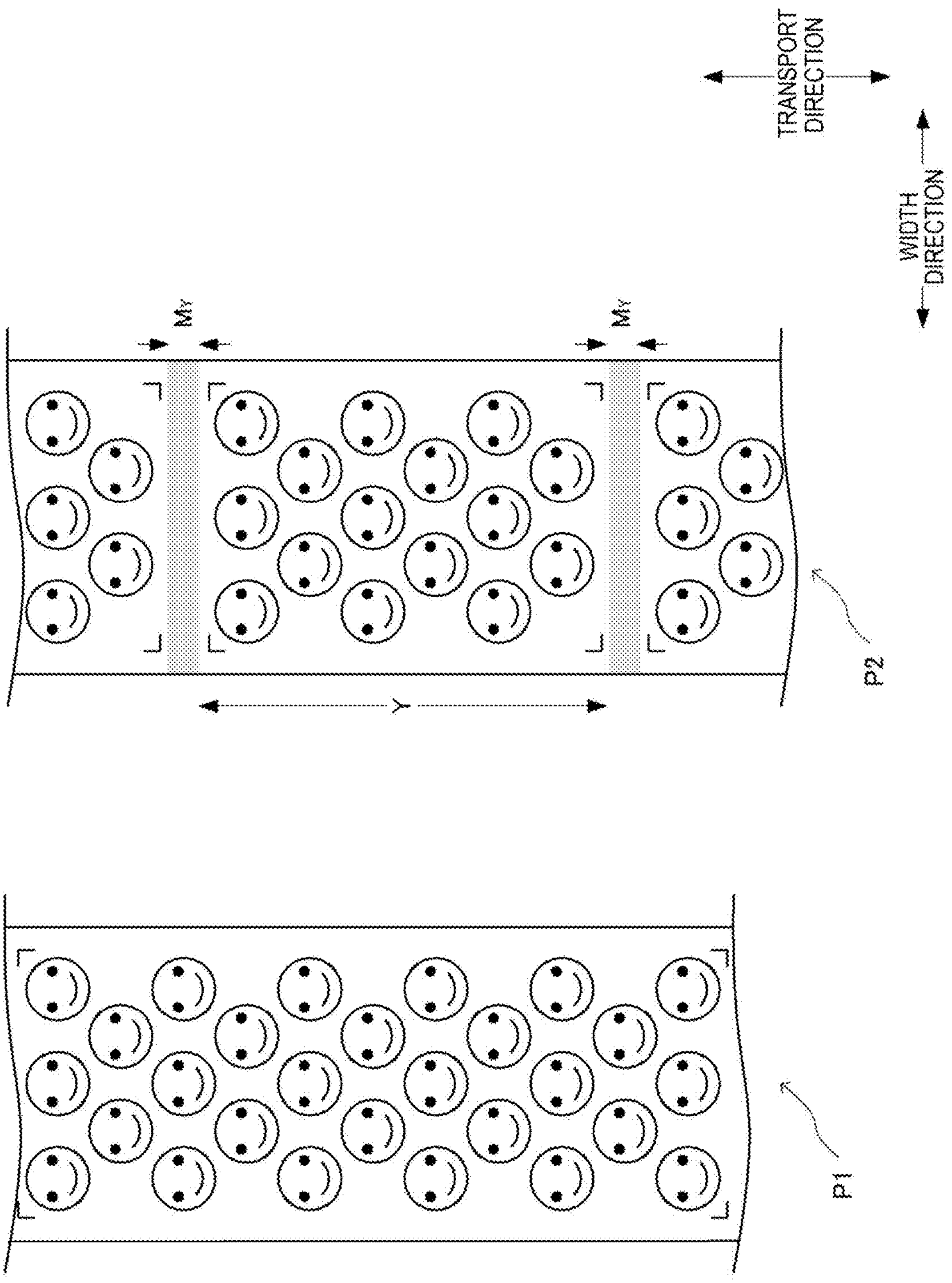
FIG. 11 shows an arrangement example of images.

FIG. 11 shows an arrangement example P1 (left) of a plurality of images when a cutting machine is not to be used and an arrangement example P2 (right) of a plurality of images when a cutting machine is to be used. The arrangement example P1 when a cutting machine is not to be used indicates that a margin area is not particularly provided in the transport direction of the medium. The arrangement example P2 when a cutting machine is to be used indicates that the margin area $M_Y$ is provided and no image is arranged in the margin area $M_Y$, when the maximum cuttable range Y (or the accuracy guarantee range) in the transport direction of the medium is exceeded. When a cutting machine is to be used, the provision of the margin area in this way enables the arrangement of the image within the range in the transport direction (or within the accuracy guarantee range in the transport direction) which the cutting machine can cope with in the transport direction of the medium.

Also, in the above embodiment, an example in which the optical sensor installed on the carriage reads the barcode or the cutting mark has been described, but the form of reading the barcode or the cutting mark is not limited thereto. For example, a cutting machine provided with an optical sensor in which the entirety of a set medium falls within in the image capture range thereof may be adopted. When such a cutting machine is to be used, the barcode and the cutting mark may not necessarily be printed within the cuttable range and may be arranged outside the cuttable range. The barcode may be replaced with a two-dimensional code, a number, a character, a symbol, or the like.

The present disclosure can also be applied as a program executed by a computer or as a method. For example, the foregoing contents are applicable as the disclosure of a cutting control method including: causing an image acceptance unit to accept an image to be a print target; causing a cutting machine designation unit to accept cutting machine designation information which is information about a cutting machine for cutting a medium; and causing an arrangement setting unit to limit an area on the medium where the image can be arranged, based on the cutting machine designation information. This method can be implemented by causing a processor of a computer as the information processing device to function as the image acceptance unit, the arrangement setting unit, the cutting machine designation unit, or the like. Also, the foregoing contents are applicable as the disclosure of a non-transitory computer-readable storage medium storing a cutting control program, the cutting control program causing a computer to function as: an image acceptance unit that accepts an image to be a print target; a cutting machine designation unit that accepts cutting machine designation information which is information about a cutting machine for cutting a medium; and an arrangement setting unit that limits an area on the medium where the image can be arranged, based on the cutting machine designation information.

Also, the system, the program, and the method as described above may be implemented as a stand-alone device in some cases, or may be implemented using components provided in a plurality of devices in some cases, and include various aspects. Also, the present disclosure may be changed as appropriate, such as a part being software and a part being hardware. Moreover, the present disclosure can be applied as a recording medium of a program that controls the system. Obviously, the recording medium storing the program may be a magnetic recording medium or may be a semiconductor memory, and any recording medium to be developed in the future can be similarly employed.

What is claimed is:

1. An information processing device comprising:

an image acceptance unit configured to accept an image to be printed by a printer;

a cutting machine designation unit configured to accept cutting machine designation information which is information about a cutting machine located separately from the printer for cutting a medium; and an arrangement setting unit configured to limit an area on the medium where the image is to be arranged, based on the cutting machine designation information.

2. The information processing device according to claim 1, wherein the arrangement setting unit causes the area on the medium where the image is to be arranged, to be different between when the cutting machine designation information indicates that the cutting machine is to be used and when the cutting machine designation information indicates that the cutting machine is not to be used.

3. The information processing device according to claim 2, wherein assuming that an area where the arrangement of the image is limited on the medium is a margin area, when the cutting machine designation information indicates that the cutting machine is to be used, the arrangement setting unit expands the margin area compared with when the cutting machine designation information indicates that the cutting machine is not to be used.

4. The information processing device according to claim 1, wherein the arrangement setting unit causes the area on the medium where the image is to be arranged, to be different between when the cutting machine designation information indicates that a first cutting machine is to be used as the cutting machine and when the cutting machine designation information indicates that a second cutting machine is to be used as the cutting machine.

5. The information processing device according to claim 1, wherein the arrangement setting unit automatically sets the arrangement of the image on the medium.

6. The information processing device according to claim 2, wherein assuming that an area where the arrangement of the image on the medium is limited is a margin area, that a direction in which the medium is transported when the image is printed on the medium is a transport direction, and that a direction intersecting the transport direction is a width direction, the margin area is the area where the image is not arranged in the width direction.

7. The information processing device according to claim 2, wherein assuming that an area where the arrangement of the image is limited on the medium is a margin area, and that a direction in which the medium is transported when the image is printed on the medium is a transport direction, the margin area is the area where the image is not arranged in the transport direction.

8. The information processing device according to claim 1, wherein when the arrangement setting unit displays a preview screen showing a result of setting the arrangement of the image, and the cutting machine designation unit accepts the cutting machine designation information indicating that the cutting machine is to be used, the preview screen shows an uncuttable area that is an area where the cutting machine cannot execute a cutting operation.

9. The information processing device according to claim 1, wherein the arrangement setting unit arranges a cutting mark indicating a position serving as a reference when the cutting machine executes a cutting operation, within a cuttable area which is an area where the cutting machine indicated by the cutting machine designation information can execute the cutting operation on the medium.

10. The information processing device according to claim 1, wherein the arrangement setting unit arranges a barcode related to a cutting operation to be executed by the cutting machine, within a cuttable area that is an area where the cutting machine indicated by the cutting machine designation information can execute the cutting operation on the medium.

11. The information processing device according to claim 1, further comprising:

a storage unit, wherein assuming that a direction in which the medium is transported when the image is printed on the medium is a transport direction, and that a direction intersecting the transport direction is a width direction, the storage unit stores a maximum cuttable range in the transport direction and a maximum cuttable range in the width direction for each type of the cutting machine.

12. A cutting control method comprising:

causing an image acceptance unit to accept an image to be printed by a printer;

causing a cutting machine designation unit to accept cutting machine designation information which is information about a cutting machine located separately from the printer for cutting a medium; and causing an arrangement setting unit to limit an area on the medium where the image is to be arranged, based on the cutting machine designation information.

13. A non-transitory computer-readable storage medium storing a cutting control program, the cutting control program causing a computer to function as:

an image acceptance unit configured to accept an image to be printed by a printer;

a cutting machine designation unit configured to accept cutting machine designation information which is information about a cutting machine located separately from the printer for cutting a medium; and an arrangement setting unit configured to limit an area on the medium where the image is to be arranged, based on the cutting machine designation information.

* * * * *